United States Patent [19]
Ochiai

[11] Patent Number: 4,763,746
[45] Date of Patent: Aug. 16, 1988

[54] VEHICLE SPEED CONTROL SYSTEM

[75] Inventor: Takeshi Ochiai, Toyota, Japan

[73] Assignee: Toyota Jidosha Kabushiki Kaisha, Aichi, Japan

[21] Appl. No.: 943,487

[22] Filed: Dec. 19, 1986

[30] Foreign Application Priority Data

Dec. 24, 1985 [JP] Japan .................................. 60-289356
Dec. 24, 1985 [JP] Japan .................................. 60-289357

[51] Int. Cl.⁴ .............................................. B60K 31/04
[52] U.S. Cl. ...................................... 180/179; 123/350
[58] Field of Search ............... 180/170, 174, 178, 179; 123/349, 350, 352

[56] References Cited

U.S. PATENT DOCUMENTS 4,519,469 5/1985 Hayashi et al. ...................... 180/170

FOREIGN PATENT DOCUMENTS 172718 10/1983 Japan .
0056637 4/1985 Japan .................................. 180/170

OTHER PUBLICATIONS

Toyota "Celica" New car features, Aug., 1986.
Toyota "Supra" New car features, Jan., 1986.

Primary Examiner—John J. Love
Assistant Examiner—Richard Camby
Attorney, Agent, or Firm—Parkhurst & Oliff

[57] ABSTRACT

A main switch of a cruise control system is combined with one of a number of the control switches such as a set/coast switch, wherein when the combined switch is once turned ON, the combined switch functions as a main switch, and when the combined switch is twice turned ON, the main function of the combined switch is operated. On the other hand, when the combined switch is once turned ON and this state is continued for more than a predetermined time, the combined switch functions as a main switch at first, and after the predetermined time has passed, the main function of the combined switch is operated.

15 Claims, 4 Drawing Sheets

VEHICLE SPEED CONTROL SYSTEM

BACKGROUND OF THE INVENTION

(1) Field of the Invention

The present invention relates to a vehicle speed control system for automatically adjusting the speed of an automotive vehicle to a preset speed

(2) Description of the Related Art

The automobile has become indispensable in contemporary life, and comfort when driving has become increasingly important. To this end, some vehicles are provided with a speed control system to reduce driver fatigue.

A vehicle speed control system, e.g., a cruise control system, automatically controls the opening of the throttle valve of the engine in accordance with the road gradient to maintain a constant vehicle speed, i.e., a desired vehicle speed, and the speed control system is usually provided with a main switch for connecting the system to a battery and control switches such as a set/-coast switch, a resume/accelerate switch, and a cancel switch.

The control switches are usually installed in an inner zone of a steering wheel such as on a spoke or on a steering pad, so that they can be easily operated when driving, but the main switch is usually installed in a instrument panel, which is at a distance from the control switches. Accordingly, to activate the cruise control system, first the driver must turn ON the main switch, and then set one of the control switches, which is rather inconvenient. An improvement can be made by installing the main switch in the inner zone of the steering wheel, but this is not practical because there is little space therein in which to install the main switch, and in addition, the wiring for the main switch becomes complicated.

SUMMARY OF THE INVENTION

An object of the present invention is to provide an apparatus for controlling the speed of an automobile, e.g., a cruise control system, which can be easily operated by the driver.

According to the present invention, a main switch of a cruise control system is combined with one of the control switches such as a set/coast switch, whereby when the combined switch is once turned ON, the cruise control system is connected to the battery, and when the combined switch is twice turned ON, the main function of the combined switch (to set the vehicle speed at a constant value) is operated. Further, when the combined switch is once turned ON and this ON state is continued for more than a predetermined time, the cruise control system is first connected to the battery, and after the predetermined time has passed, the above main the function of the combined switch is operated.

BRIEF EXPLANATION OF DRAWINGS

The present invention will be more clearly understood from the description as set forth below with reference to the accompanying drawings, wherein.

DESCRIPTION OF THE PREFERRED EMBODIMENTS

Figures 1, 2:
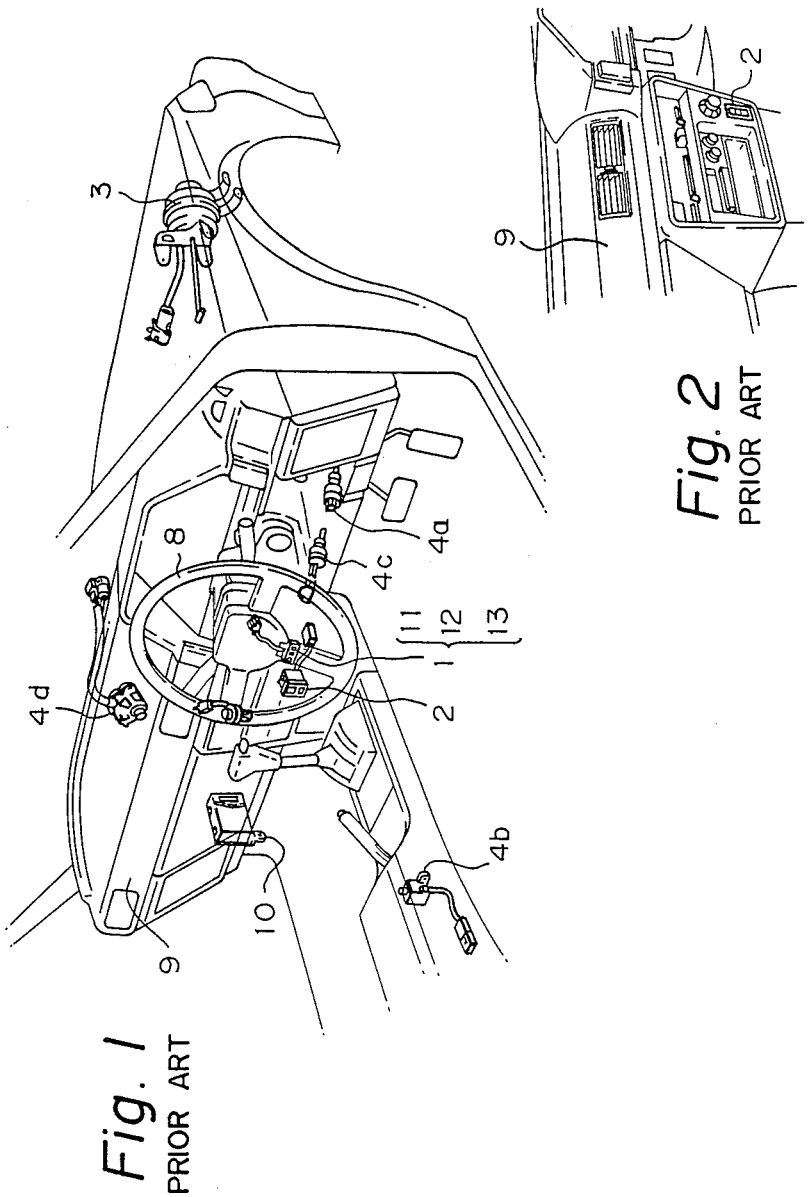
FIG. 1 is a cutaway perspective view of a prior art vehicle including a cruise control system.
FIG. 2 is a perspective view of the instrument panel of the vehicle shown in FIG. 1.

In FIG. 1, which shows a prior art vehicle, a cruise control system usually consists of a vehicle speed sensor (not shown), a controller 10, an actuator 3, a main switch 2, control switches 1 including a set/coast switch 11, a resume/acceleration switch 12, and a cancel switch 13, and various cancel switches 4 such as a stop lamp switch 4a, a parking brake switch 4b, a clutch switch 4c of a manual transmission vehicle (or a neutral switch 4d of an automatic transmission vehicle).

The function of the switches mentioned above is as follows. The vehicle speed sensor is used to detect the running speed of the vehicle; the controller 10 is used to control the speed of the vehicle according to the operation of the control switches and is usually constructed by a microcomputer; the actuator 3 is used for changing or maintaining the opening of the throttle valve (not shown) according to a signal from the controller 10; the main switch 2 is used for turning ON or OFF the power of the cruise control system; the set/coast switch 11 having a SET position, an OFF position, and a COAST position, is used for maintaining the speed of the vehicle when this switch is at a SET position and is used for decreasing the speed of the vehicle when this switch is at a COAST position; the resume/acceleration switch having a RESUME position, an OFF position, and an ACCELERATION position, is used for turning the speed of the vehicle to a previously set speed when this switch is at a RESUME position and is used for increasing the speed of the vehicle when this switch is at an ACCELERATION position; the cancel switch 13 is used for cancelling the operation of the cruise control system; and the various cancel switches 4 are used for resetting the operation of the cruise control system when at least one of these switches is turned ON.

FIG. 2 shows the location of the main switch 2 of the cruise control system of the vehicle. The main switch 2 is mounted on the instrument panel 9 of the vehicle and is at a distance from the steering wheel (not shown).

As explained above, the main switch 2 of the cruise control system is separated from the control switches installed in an inner zone of the steering wheel. Therefore, when using the cruise control system, the driver must take one hand from the steering wheel and stretch over a distance from the wheel to turn ON the main switch, and then operate the control switch. It is inconvenient for the driver to operate two such different switches located at a distance from each other in order to activate the cruise control system.

Figure 3:
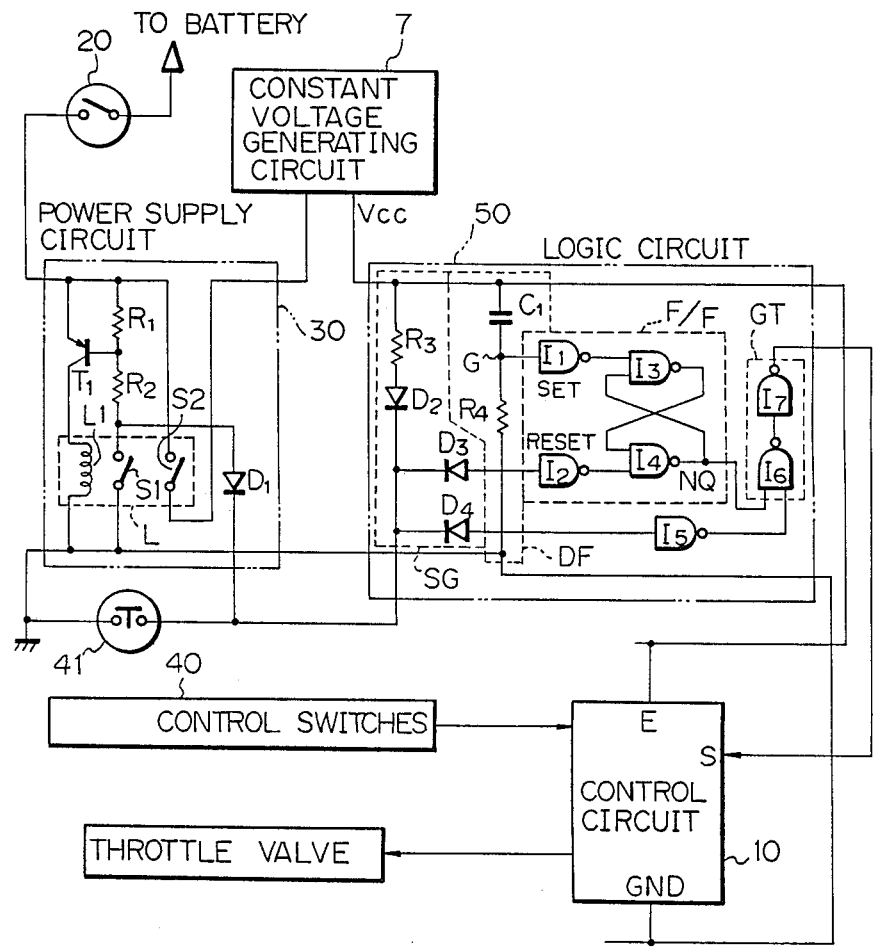
FIGS. 3, 4, and 5 are circuit diagrams illustrating embodiments of an apparatus for controlling the traveling speed of an automotive vehicle according to the present invention.

FIG. 3 is a circuit diagram of one embodiment of an apparatus for controlling the traveling speed of an automotive vehicle according to the present invention. This apparatus is provided with an ignition switch 20, a power supply circuit 30, control switches 40 (one of the control switches is shown as a set switch 41), a constant voltage generating circuit 7, a logic circuit 50, and a control circuit 10.

The power supply circuit 30 is connected to a battery (not shown) through the ignition switch 20, and the circuit 30 generates power only when one of the control switches 40, i.e., a set switch 41, connected to the power supply circuit 30, is turned ON. The power supply circuit 30 comprises a relay L having a coil L1, a first switch S1, and a second switch S2, transistor T1, two serially-connected resistors R1 and R2, and a diode D1. The first switch S1 and the second switch S2 are normally turned OFF but are turned ON when current flows through the coil L1. The coil L1 is connected to the ground and a collector of the transistor T1. An emitter of the transistor T1 is connected to the ignition switch 20 and a base of the transistor T1 is connected to a connecting point of the resistors R1 and R2. The resistor R1 is connected to the ignition switch and the resistor R2 is connected to the ground through the switch S1. An anode of the diode D1 is connected to a connecting point of the resistor R2 and the switch S1 and a cathode of the diode is connected to the set switch 41. The second switch S1 is connected to the ignition switch 20.

The control switches 40 usually consist of a set switch for maintaining the speed of the vehicle, a coast switch for decreasing the speed of the vehicle, a resume switch for returning the speed of the vehicle to a previously set speed, an accelerate switch for increasing the speed of the vehicle, and various kinds of cancel switches for cancelling the operation of the apparatus. Of these control switches, only the set switch 41 is shown in FIG. 3.

The constant voltage generating circuit 7 is connected to the switch S2 of the power supply circuit 30 and converts a voltage of the battery into a constant voltage Vcc such as 5 V.

The logic circuit 50 is connected to the circuit 7 and the set switch 41, and the circuit 50 generates a set signal when the set switch 41 is twice operated after the ignition switch 20 is turned ON. The logic circuit 50 comprises a signal generating circuit SG for generating a high level signal when the set switch 41 is turned OFF and generating a low level signal when the set switch 41 is turned ON. The logic circuit 50 further comprises a differentiator DF for generating a high level signal, which decreases soon after the set switch 41 is once operated, an RS flip-flop F/F for generating a high level signal at the inverted output NQ when the reset terminal is once at a high level, an inverter I5, and a gate circuit GT for generating a set signal when both inputs are at a high level.

The signal generating circuit SG comprises a resistor R3 and three diodes D1, D2 and D3 having cathodes connected to the set switch 41. The resistor R3 is connected between the circuit 7 and an anode of the diode D2. The differentiator DF has a capacitor C1 and a resistor R4 connected in series at a connection point G. The capacitor C1 is connected to the circuit 7 and the resistor R4 is connected to the ground. The RS flip-flop F/F is comprised of NAND gates I1 and I2, and cross-coupled NAND gates I3 and I4. The RS flip-flop F/F has a set terminal which is connected to the point G, a reset terminal which is connected to the diode D3, and an inverted output NQ. The gate circuit GT has two inputs; one connected to the diode D4 through the inverter I5 and the other connected to the inverted output NQ of the RS flip-flop. The gate circuit GT generates a set signal for the control means when both inputs are at a high level.

In the control circuit 10, E designates a terminal connected to the circuit 7, GND a terminal connected to the ground, and S a terminal connected to the inverted output of the logic circuit 50 for receiving a set signal therefrom. The control switches 40 are connected to the control circuit 10 and the control circuit 10 controls a throttle valve according to signals from the control switches 40 and the logic circuit 50.

In FIG. 3, when the driver turns ON the ignition switch 20, the power supply circuit 30 is connected to the battery. But, in this state, since the set switch 41 is OFF, the relay L is not turned ON, i.e., the switches S1 and S2 are not turned ON, so that the constant voltage generating circuit 7 is not connected to the battery. That is, the output voltage of the circuit 7 is zero, and accordingly, the circuits 50, 60 and 10 are not activated.

When the driver turns ON the set switch when the vehicle is running, current flows through resistors R1, R2 and a diode D1, so that the transistor T1 turns ON, thereby turning ON the switches S1 and S2 of the relay L.

When the relay L turns ON, the constant voltage generating circuit 7 is connected to the battery, and the circuit 7 generates the voltage Vcc, and thus the logic circuit 50 and the control circuit 10 are supplied with the voltage Vcc. Note that, once the relay L is turned ON, the ON state of the relay L is maintained until the driver turns OFF the ignition switch 20.

When voltage Vcc is supplied to the differentiator DF, a high level pulse signal is generated at a point G due to the capacitive coupling, and this pulse signal makes the set terminal of the RS flip-flop F/F momentarily high. At this time, since the reset terminal of the flip-flop F/F is at the ground, the flip-flip F/F is set so that the output NQ thereof is low, thereby making the input of the gate circuit GT low. Therefore, the output of the gate circuit GT is also grounded, i.e., a set signal is not generated, and accordingly, the control circuit 10 is not set.

The pulse signal at point G is decreased from a high level to a low level at a time constant determined by the capacitor C1 and the resistor R4. The level of the reset terminal, however, is still at low level, and thus the output level of the inverted output NQ is maintained at ground. The level of point G remains grounded thereafter.

When the driver turns OFF the set switch 41, the level of the reset terminal of the flip-flop F/F becomes high, so that the inverted output NQ of the flip-flop F/F also becomes high, i.e., one of the inputs of the gate circuit GT becomes high. Conversely, a high level signal from the diode D4 is converted to a low level by the inverter I5, and the other input of the gate circuit GT is then grounded. As a result, the output of the gate circuit GT is grounded, i.e., the gate circuit GT does not generate a set signal, and thus the control circuit 10 is not set.

Subsequently, when the driver turns ON the set switch 41, the I level of the reset terminal becomes low but the level of the inverted output NQ is maintained at the former state, i.e., grounded. In this state, the input of the inverter I5 is grounded so that the output level of the inverter I5 becomes high. Accordingly, both inputs of the gate circuit GT become high, so that the gate circuit GT generates a set signal at the output thereof. This set signal is received by the set terminal S of the control circuit 10, so that the control circuit 10 is set by the logic circuit 50.

Note that, when the driver turns OFF the set switch 41, the output of the inverter I5 becomes low and the gate circuit GT stops generating the set signal to the control circuit 10. In this case, the control circuit 10 maintains the opening of the throttle valve at a constant value. Subsequently, whenever the driver turns ON the set switch 41, another set signal is received by the control circuit 10, and the control circuit 10 then maintains the opening of the throttle at another constant value. The function of the control circuit 10 is cancelled when the driver turns ON the cancel switch, or another cancel switch such as a break switch is turned ON.

Further, when the driver turns OFF the ignition switch 20, the relay L of the power supply circuit 30 is turned OFF, so that the constant voltage generating circuit 7 stops generating the voltage Vcc. Accordingly, the control circuit 10 stops controlling the vehicle running speed at a constant speed.

Figure 4:
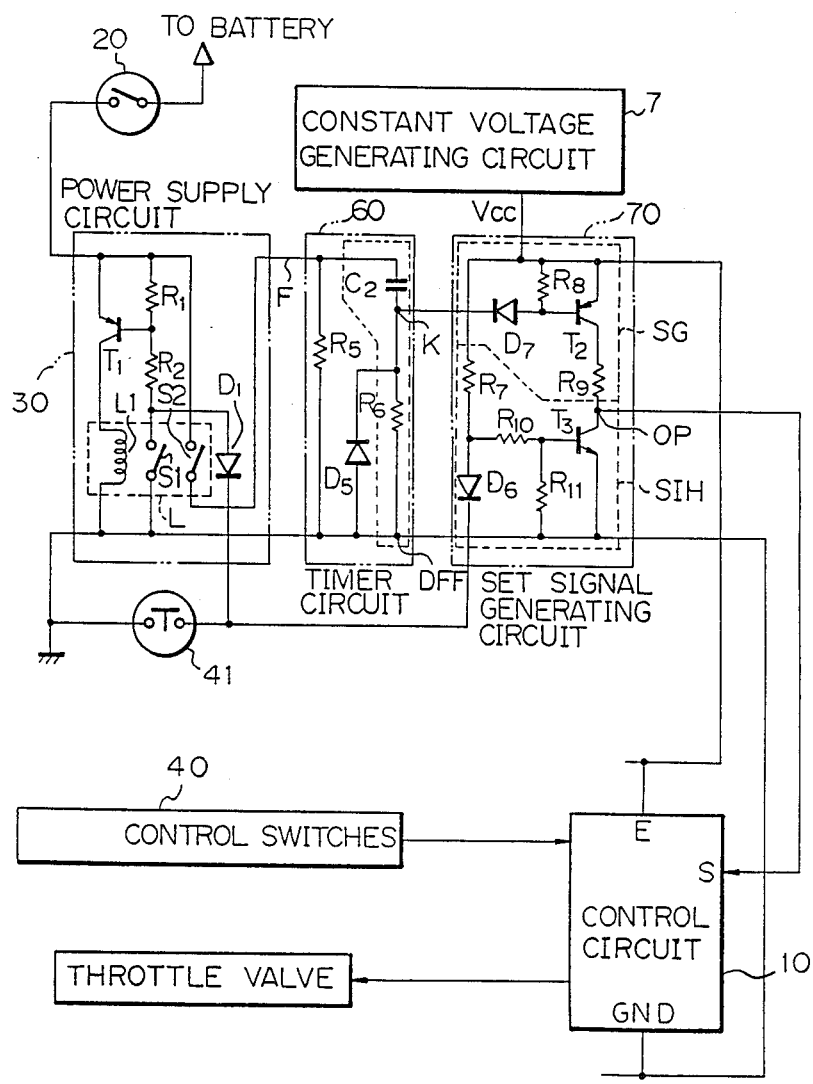

FIG. 4 is a circuit diagram of another embodiment of the apparatus of the cruise control system according to the present invention. In FIG. 4, the elements which are the same as those of FIG. 3 are given by the same references. In FIG. 4, the logic circuit 50, is replaced by a timer circuit 60 and a set signal generating circuit 70.

The timer circuit 60, having two resistors R5 and R6, a capacitor C2, and a diode D5, is also connected to the switch S2 of the power supply circuit 30. The resistor R5 is connected between the switch S2 and the ground. The capacitor C2 and the resistor R6 are connected in series at a point K and thereby form a differentiator DFF.

The set signal generating circuit 70 is connected to the circuit 7, to the timer circuit 60, and to the set switch 41. The set signal generating circuit 70 comprises a signal generating circuit SG and a signal inhibiting circuit SIH, and generates a set signal when a predetermined time has passed after the set switch 41 is turned ON.

The signal generating circuit SG, having two resistors R8 and R9, a transistor T2, and a diode D7, generates a high level signal when the output at a point K becomes lower than a predetermined level after the set switch 41 is once turned ON. An emitter of the transistor T2 is connected to the circuit 7, and a collector of the transistor T2 is connected to the resistor R9, which is connected to the output OP of the set signal generating circuit 70. A base of the transistor T2 is connected to point K through the diode D7.

The signal inhibiting circuit SIH, having three resistors R7, R10 and R11, a transistor T3, and a diode D6, inhibits the transmission of the set signal from the output OP of the set signal generator 70 when the set switch 41 is turned OFF. Resistors R7, R10, and R11, are connected in series in this order between the circuit 7 and the ground. The set switch 41 is connected to a connecting point of the resistors R7 and R10 through the diode D6. Also, a base of the transistor T3 is connected to a connecting point of the resistors R10 and R11. A collector of the transistor T3 is connected to the resistor R9 of the set signal generating circuit 70, i.e., the output of the set signal generating circuit 70, and an emitter of the transistor T3 is connected to the ground.

In the control circuit 10, E designates a terminal connected to the circuit 7, GND a terminal connected to the ground, and S a terminal connected to the output OP of the signal generating circuit 70, for receiving a set signal therefrom. The control switches 40 are connected to the control circuit 10, and the control circuit 10 controls a throttle valve according to signals from the control switches 40 and the set signal generating circuit 70.

In FIG. 4, when a driver turns ON the ignition switch 20, the power supply circuit 30 is connected to the battery. But, in this state, as the set switch 41 is OFF, the relay L is not turned ON, i.e., the switches S1 and S2 are not turned ON, so that the constant voltage generating circuit 7 is not connected to the battery. That is, the output voltage of the circuit 7 is zero, and accordingly, the circuits 70 and 10 are not activated.

When the driver turns ON the set switch 41 when the vehicle is running, current flows through the resistors R1, R2 and a diode D1, so that the transistor T1 turns ON, thereby turning ON the switches S1 and S2 of the relay L.

When the relay L turns ON, the constant voltage generating circuit 7 is connected to the battery, and the circuit 7 generates the voltage Vcc, so that the set signal generating circuit 70 and the control circuit 10 are supplied with the voltage Vcc. Note that, when the relay L is turned ON, the ON state of the relay L is maintained until the driver turns OFF the ignition switch 20.

When the switch S2 is turned ON, the differentiator DFF generates a high level pulse signal at point K due to the capacitive coupling. Then the pulse signal at the point K is then decreased from a high level to a low level at a time constant determined by the capacitor C2 and the resistor R6. When the level at point K is high, the transistor T2 is in an OFF state because the base level of the transistor T2 is higher than the ON level of the transistor T2. Even if the set switch is turned ON in this state, the base of the transistor T3 is grounded through the resistor R10, diode D6, and the set switch 41, so that the transistor T3 is also in an OFF state. Accordingly, the control circuit 10 is not set.

When the driver turns OFF the set switch 41, current flows through the resistors R7, R10, and R11 and the bias voltage is generated at the connection point of the resistors R10 and R11, so that the transistor T3 is turned ON, and the output OP of the set signal circuit 70 is then grounded.

Since the time constant determined by the capacitor C2 and the resistor R6 is relatively large, the pulse signal at the point K is decreased gradually. Therefore, a predetermined time must lapse before the level of the point K becomes lower than a predetermined level, i.e., an ON level of the transistor T2. After this predetermined time has passed, the transistor T2 is turned ON to generate a signal, but this signal does not appear at the output OP of the set signal generating circuit 70 in this state, because the transistor T3 is turned ON.

Subsequently, when the driver turns ON the set switch 41, the transistor T3 is turned OFF, and as a result, the signal generated by the signal generating circuit SG appears at the output OP as a set signal. This set signal is then transmitted to the control circuit 10, and is received by the set terminal S of the control circuit 10, that the control circuit 10 is set by the set signal generating circuit 70.

Note that, when the driver turns OFF the set switch 41, the transistor T3 is turned ON again and the set signal generating circuit 70 stops generating the set signal to the control circuit 10. In this case, the control circuit 10 maintains the opening of the throttle valve at a constant value. Subsequently, whenever the driver turns ON the set switch 41, another set signal is received by the control circuit 10, and the control circuit 10 then maintains the opening of the throttle at another constant value. The function of the control circuit 10 is cancelled when the driver turns ON the cancel switch, or another cancel switch(es) such as a break switch is turned ON.

As shown in FIG. 4 the control circuit 10 can be set by another operation. This is, when the driver continues a turning ON operation of the set switch 41 for more than the predetermined time, the transistor T3 of the set signal inhibiting circuit SIH is maintained in an OFF state. In this state, the level of the point K is decreased gradually from a high level to a low level, after the set switch 41 is turned ON. As a result, when the level at point K becomes lower than the predetermined value, the transistor T3 is turned ON and generates a set signal. This set signal is received by the set terminal S of the control circuit 10, thus setting the control circuit 10.

Further, when the driver turns OFF the ignition switch 20, the relay L of the power supply circuit 30 is turned OFF, so that the constant voltage generating circuit 7 stops generating the voltage Vcc. Then the control circuit 10 stops controlling the vehicle running speed at a constant speed.

Figure 5:
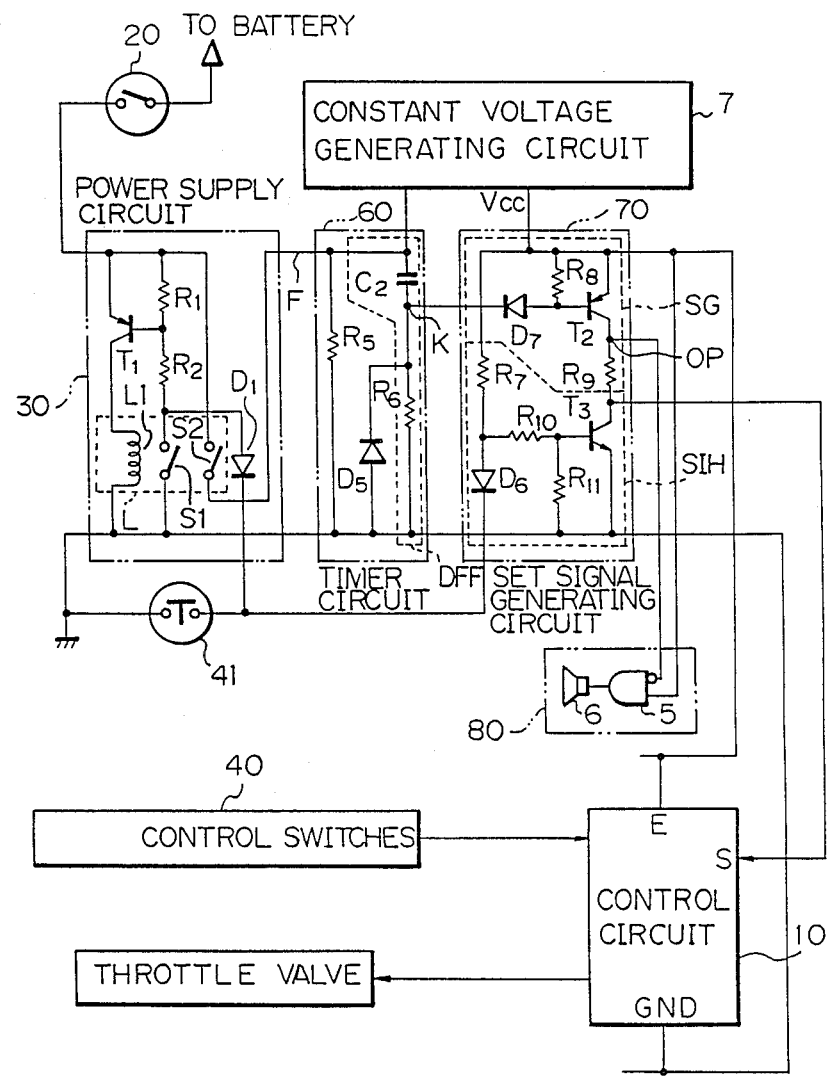

FIG. 5 is a modification of the apparatus of FIG. 4. In FIG. 5, an indicating means 80 is added to FIG. 4. The indicating means 80 is comprised of an AND gate 5 and an indicator 6, such as a buzzer. An inverted input of the gate 5 is connected to the collector of the transistor T2 and another input thereof is connected to the circuit 7. The indicator 6 is turned ON when the output of the gate 5 is at a high level and the inverted input of the gate 5 is at a low level and the other input is at a high level.

In FIG. 5, when the driver turns ON the set switch 41, the constant voltage generating circuit 7 generates a voltage Vcc. But at this time the collector of the transistor T2 is grounded, so that the indicator indicates that the set switch 41 is turned ON. The indication of the indicator 6 is maintained until the transistor T2 is turned ON, i.e., the level at point K becomes lower than the predetermined level after the predetermined time has passed. Accordingly, the driver is informed of the set timing of the control circuit 10 by the indicator 6, and thus this indicator 6 helps the driver to set the control means easily.

Namely, when wishing to set the control circuit 10, the driver turns ON the set switch 41 so as to turn ON the indicator 6, and then turns OFF the set switch 41 before the indicator 6 stops indicating. After the indication is completed, the driver again turns ON the set switch 41, and the control circuit 10 is set by the set signal from the set signal generating means 70. On the other hand, if the driver once turns ON the set switch 41 and does not turn OFF the switch 41 until the indicator 6 stops indicating, then the control circuit 10 receives the set signal from the set signal generating circuit 70 as soon as the indicator stops indicating. Note, a winking lamp or a synthesized artificial voice apparatus can be also used for the indicator.

Note that, although the embodiment of the present invention are explained by using an analog circuit, the present invention can be realized by using a microcomputer.

I claim:

1. An apparatus for controlling the traveling speed of an automotive vehicle driven by an internal combustion engine controlled by a throttle valve, comprising:
   an ignition switch;
   control switches for controlling a speed of the vehicle;
   a power supply circuit connected to said ignition switch for generating power only when one of said control switches is turned ON, said power supply circuit comprising:
      a relay having a coil connected to ground, a first switch connected to said ground, and a second switch connected between said ignition switch and said logic circuit, said first and second switches being turned ON when current flows in said coil;
      a transistor having a collector connected to said coil and an emitter connected to said ignition switch;
      two serially-connected resistors, a connection point of which is connected to a base of said transistor, one end of said transistor being connected to said ignition switch; and another end of said transistor being connected to said first switch;
      a diode having an anode connected to said first switch and a cathode connected to said one of said control switches;
   a logic circuit connected to said power supply circuit and one of said control switches for generating and transmitting a set signal to a control means when said one of said control switches is twice operated after said ignition switch is turned ON; and
   a control means connected to an output of said logic circuit for controlling said throttle valve according to signals from said control switches, said control means being set by an output of said logic circuit.

2. An apparatus as set forth in claim 1, further comprising:
   a constant voltage generating circuit connected between said power supply circuit and said logic circuit generating a constant voltage.

3. An apparatus as set forth in claim 1, wherein said control switches include a set switch for maintaining a speed of the vehicle, a coast switch for decreasing a speed of the vehicle, a resume switch for returning a speed of the vehicle to a previously set speed, an accelerate switch for increasing a speed of the vehicle, and various cancel switches for resetting an operation of the apparatus.

4. An apparatus as set forth in claim 1, wherein said logical circuit includes:
   a signal generating circuit connected between said power supply circuit and said one of said control switches for generating a high level signal when said one of said control switches is turned OFF, and generating a low level signal when said one of said control switches is turned ON;
   a differentiator connected to said power supply circuit;
   an RS flip-flop, having a set terminal connected to said differentiator, and a reset terminal connected to said signal generating circuit;
   an inverter connected to said signal generating circuit;
   a gate circuit having an input connected to an inverted output of said RS flip-flop, and another input connected to said inverter, said gate circuit generating a set signal for setting said control means when both inputs thereof are at a high level.

5. An apparatus for controlling the traveling speed of an automotive vehicle driven by an internal combustion engine controlled by a throttle valve, comprising:
   an ignition switch;
   control switches for controlling a speed of the vehicle;
   a power supply circuit connected to said ignition switch for generating power only when one of said control switches is turned ON, said power supply circuit comprising:

a relay having a coil connected to ground, a first switch connected to said ground, and a second switch connected between said ignition switch and said logic circuit, said first and second switches being turned ON when current flows in said coil;

a transistor having a collector connected to said coil and an emitter connected to said ignition switch;

two serially-connected resistors, a connection point of which is connected to a base of said transistor, one end of said transistor being connected to said ignition switch, and another end of said transistor being connected to said first switch;

a diode having an anode connected to said first switch and a cathode connected to said one of said control switches;

a timer circuit connected to said power supply circuit for measuring a predetermined time period after a change from an OFF state to an ON state of said power supply circuit;

a set signal generating circuit connected to said timer circuit and said one of said control switches for generating a set signal when said one of said control switches is operated after said predetermined time period has passed; and a control means connected to said signal generating circuit for controlling said throttle valve, said control means being set by a set signal from said set signal generating circuit.

6. An apparatus as set forth in claim 5, further comprising:

a constant voltage generating circuit connected between said power supply circuit and said set signal generating circuit for generating a constant voltage and supplying said voltage to said set signal generating circuit.

7. An apparatus as set forth in claim 5, wherein said control switches include a set switch for maintaining a speed of the vehicle, a coast switch for decreasing a speed of the vehicle, a resume switch for returning a speed of the vehicle to a previously set speed, an accelerate switch for increasing a speed of the vehicle, and various cancel switches for resetting an operation of the apparatus.

8. An apparatus as set forth in claim 5, wherein said timer circuit includes:

a capacitor connected to an output of said power supply circuit, and a resistor connected between said capacitor and ground.

9. An apparatus as set forth in claim 5, wherein said set signal generating circuit includes.

a first switching circuit connected to said timer circuit and said power supply circuit for generating a set signal for said control when said predetermined time period has passed;

a second switching circuit, connected to said first switching circuit, said power supply circuit, and said one of said control switches, for inhibiting transmission of said set signal when said one of said control switches is turned ON.

10. An apparatus as set forth in claim 5, further comprising:

a means for indicating whether or not said predetermined time period has passed.

11. An apparatus as set forth in claim 10, wherein said indicating means comprises a buzzer.

12. An apparatus as set forth in claim 10, wherein said indicating means comprising a lamp.

13. An apparatus as set forth in claim 10, wherein said indicating means comprises a synthesized artificial voice generator.

14. An apparatus for controlling the traveling speed of an automotive vehicle driven by an internal combustion engine controlled by a throttle valve, comprising:

an ignition switch;

control switches for controlling a speed of the vehicle;

a power supply circuit connected to said ignition switch for generating power only when one of said control switches is turned ON;

a logic circuit connected to said power supply circuit and one of said control switches for generating and transmitting a set signal to a control means when said one of said control switches is twice operated after said ignition switch is turned ON, said logic circuit comprising:

a signal generating circuit connected between said power supply circuit and said one of said control switches for generating a high level signal when said one of said control switches is turned OFF, and generating a low level signal when said one of said control switches is turned ON;

a differentiator connected to said power supply circuit;

an RS flip-flop, having a set terminal connected to said differentiator, and a reset terminal connected to said signal generating circuit;

an inverter connected to said signal generating circuit; and a gate circuit having an input connected to an inverted output of said RS flip-flop, and another input connected to said inverter, said gate circuit generating a set signal for setting said control means when both inputs thereof are at a high level;

and a control means connected to an output of said circuit for controlling said throttle valve according to signals from said control switches, said control means being set by an output of said logic circuit.

15. An apparatus for controlling the traveling speed of an automotive vehicle driven by an internal combustion engine controlled by a throttle valve, comprising:

an ignition switch;

control switches for controlling a speed of the vehicle;

a power supply circuit connected to said ignition switch for generating power only when one of said control switches is turned ON;

a timer circuit connected to said power supply circuit for measuring a predetermined time period after a change from an OFF state to an ON state of said power supply circuit;

a set signal generating circuit connected to said timer circuit and said one of said control switches for generating a set signal when said one of said control switches is operated after said predetermined time period has passed, said signal generating circuit comprising:

a first switching circuit connected to said timer circuit and said power supply circuit for generating a set signal for said control when said predetermined time period has passed;

a second switching circuit, connected to said first switching circuit, said power supply circuit, and said one of said control switches, for inhivbiting transmission of said set signal when said one of said control switches is turned ON;
and a control means connected to said signal generating circuit for controlling said throttle valve, said control means being set by a set signal from said set signal generating circuit.

* * * * *